United States Patent [19]

Irinatsu et al.

[11] Patent Number: 6,103,056

[45] Date of Patent: Aug. 15, 2000

[54] METHOD FOR CONTROLLING DEINKING FLOTATION USING INTERFACIAL POTENTIAL OF INK PARTICLES AND PULP

[75] Inventors: Yuichi Irinatsu; Yoshitaka Miyauchi; Hiromichi Takahashi, all of Wakayama, Japan

[73] Assignee: Kao Corporation, Tokyo, Japan

[21] Appl. No.: 09/117,437

[22] PCT Filed: May 27, 1997

[86] PCT No.: PCT/JP97/01794

§ 371 Date: Jul. 30, 1998

§ 102(e) Date: Jul. 30, 1998

[87] PCT Pub. No.: WO97/46753

PCT Pub. Date: Dec. 11, 1997

[30] Foreign Application Priority Data

Jun. 3, 1996 [JP] Japan ................................ 8-140248

[51] Int. Cl.$^7$ ....................................................... D21B 1/08
[52] U.S. Cl. ...................................... 162/4; 162/5
[58] Field of Search ................... 162/4, 5, 6, 7, 162/8, 50

[56] References Cited

U.S. PATENT DOCUMENTS 4,043,908   8/1977   Roberts et al. ........................... 210/43

FOREIGN PATENT DOCUMENTS

| 0447672A1 | 9/1991 | European Pat. Off. . |
| 0492507A1 | 7/1992 | European Pat. Off. . |
| 54-23705 | 2/1979 | Japan . |
| 59-53532 | 3/1984 | Japan . |

OTHER PUBLICATIONS

A New Approache To The Selective Removal of Ink Particles By Flotation, Hiromichi Takahashi et al, Performance Chemical Research Lab., 1996 Pulping Con. 811–812.

Characterization and Flotation Studies of Electrostatic Inks, Bret A. Snyder, et al, Progress in Paper Recycling—Nov. 1993, pp. 17–26.

*Primary Examiner*—Dean T. Nguyen
*Attorney, Agent, or Firm*—Birch, Stewart, Kolasch & Birch, LLP

[57] ABSTRACT

The present invention provides a deinking process from which bulkier pulp sheets that are excellent in paper strength, printability, ect. can be obtained. A deinking process comprising the steps of sipping ink from the flotation system. The flotation step is controlled so that the interfacial potential (ξ potential) of ink particals is in the range of −5 mV to −60 mV and the interfacial potential (ξ potential) of pulp is in the range of −5 mV to − . mV wherein a difference exist of at least 10 mV in the ξ potential of the ink particles and pulp.

7 Claims, No Drawings

METHOD FOR CONTROLLING DEINKING FLOTATION USING INTERFACIAL POTENTIAL OF INK PARTICLES AND PULP

This application is the national phase under 35 U.S.C. §371 of prior PCT International Application No., PCT/JP97/01794, which has an International filing date of May 27, 1997, which designated the United States of America, the entire contents of which are hereby incorporated by reference.

BACKGROUND OF INVENTION

1. Field of the Invention

The present invention relates to a deinking method for deinking wastepapers such as newspapers, leaflets and magazines to reclaim them. More particularly, the present invention relates to a deinking process according to which bulkier pulp sheets can be obtained.

2. Prior Arts

Wastepapers are reclaimed by stripping ink from the wastepapers by a deinking treatment to prepare reclaimed pulp and manufacturing reclaimed paper from the reclaimed pulp. The conventional deinking methods generally comprises a step of stripping ink from wastepapers and a step of discharging the stripped ink.

More specifically, the deinking method comprises as main steps:

(1) a step of pulping (disintegrating) wastepapers,
(2) a step of aging, i.e., leaving the disintegrated paper as it is,
(3) a step of flotation, and
(4) a step of washing.

That is, in deinking treatment, ink bound to the fibers of wastepapers is physically and chemically (or biochemically) stripped therefrom to thereby separate the ink from the fibers. Thus, reclaimed pulp is obtained.

The foregoing ink stripping in the conventional deinking treatment is generally carried out at a high pH (pH: 10 to 9), followed by the removal of the ink under the same conditions in the flotation step.

In recent years, the properties of wastepapers which are used as the starting material have been varied because of an increase in a demand for a beautiful and stable printing and a progress in printing techniques. Besides, the degree of bond of ink to paper is widely varied from a mild to strong one. Under these circumstances, it is demanded to improve the quality and the recovery (i.e., productivity) of deinked pulp. In order to attain these purposes, various proposals are offered from various field including deinking processes, deinking agents and apparatuses used for deinking.

However, most of the techniques heretofore proposed are directed to an improvement in the whiteness of deinked pulp. Thus, it cannot be said that sufficient investigations have been made on the strength and bulk density of pulp sheets. Although the pulping step and the flotation step in the conventional deinking method are generally carried out at a pH value on the alkaline side such as a pH of 10 to 9 as described hereinbefore, it cannot be said that the paper strength and bulk density of the resulting pulp sheets are satisfactory. Although there are known some deinking methods wherein the pulping step and the flotation step are carried out at a pH of at most 9 (JP-A 54-23705, JP-A 59-53532 and U.S. Pat. No. 4,043,908), these methods are not necessarily effective as measures for improving the strength and bulk density of pulp sheets.

DISCLOSURE OF THE INVENTION

SUMMARY OF INVENTION

As a result of detailed investigations on the removal of ink by flotation, the inventors of the present invention have found out that the interfacial potentials of ink and pulp in the flotation step exert great influences on the bulk density of pulp sheets. The present invention has been completed based on this finding.

The present invention provides a deinking process comprising at least the step of stripping ink from a pulp slurry formed from wastepaper as the starting material, wherein at least one surfactant is used for ink stripping, and the step of removing the stripped ink by flotation, characterized by controlling before or in the flotation step the interfacial potential ($\xi$ potential) of ink particles in said pulp slurry containing the stripped ink to be in the range of −5 mV to −60 mV and that of pulp in said pulp slurry containing the stripped ink to be in the range of −15 mV to +15 mV with a difference of at least 10 mV between the interfacial potential ($\xi$ potential) of said ink particles and said pulp. The adjustment of the $\xi$ potential may be conducted before or in the flotation step. It may be conducted during or at least at a point in time of the flotation step.

The present invention further provides a method for controlling the deinking performance in a deinking process comprising at least the step of stripping ink from a pulp slurry formed from wastepaper as the starting material, and the step of removing the stripped ink by flotation, characterized by measuring before or in the flotation step the interfacial potential ($\xi$ potential) of ink particles and pulp in said pulp slurry containing the stripped ink and adjusting the interfacial potential ($\xi$ potential) of the ink particles to the range of −5 mV to −60 mV and the interfacial potential ($\xi$ potential) of pulp to −15 mV to +15 mV with a difference of at least 10 mV in interfacial potential ($\xi$ potential) between said ink particles and said pulp.

Thus the present invention provides a deinking process at least comprising the step of stripping ink from wastepaper as the starting material and the step of removing the stripped ink by the flotation method, characterized by using at least one surfactant for ink stripping and controlling in the flotation step the interfacial potential as the $\xi$ potential of ink particles to be in the range of −5 mV to −60 mV and that of pulp to be in the range of −15 mV to +15 mV with a difference of at least 10 mV in interfacial potential as the $\xi$ potential between the ink particles and the pulp.

In the present invention, the step of stripping ink from wastepapers as the starting material is carried out by appropriately cutting wastepapers as the starting material, adding warm water and various chemicals such as an alkaline agent thereto, adding a surfactant as a deinking agent to the resulting pulp slurry, and mechanically agitating the slurry. Subsequently, the pulp slurry containing the stripped ink is fed into a flotator to carry out flotation step. In the present invention, the interfacial potential ($\xi$ potential) of ink particles in the flotation step is controlled to be in the range of −5 mV to −60 mV, preferably −10 mV to −40 mV, further preferably −20 mV to −30 mV. On the other hand, the interfacial potential ($\xi$ potential) of pulp in the flotation step is controlled to be in the range of −15 mV to +15 mV, preferably −5 mV to +5 mV, further preferably −5 mV to 0 mV. Further, a difference in $\xi$ potential between both is controlled to be at least 10 mV, preferably at least 15 mV, further preferably at least 20 mV. It will suffice when the $\xi$ potentials are adjusted before, during or at least at a point in time of the flotation step and are measured preferably immediately before the start of the flotation step. In so far as these values are in the above-mentioned ranges, the interfacial potentials may be fluctuated in the flotation step (for example, by the addition of cationic compounds as will be mentioned later, or by other means). However, it is preferred that the above-specified interfacial potentials be satisfied in the flotation step as well. Also it is permissible to examine a method of controlling the ξ potentials to be in the above-specified ranges in the flotation step separately on a laboratory scale and apply this method to the operation on a real equipment level in factories or the like. In this case, the ξ potential control method found out preliminarily may be applied to the operation of real equipment.

The interfacial potentials (ξ potentials) of ink and pulp can be controlled by, for example, varying the pH of the system (i.e., water being treated) in the flotation step or adding an inorganic electrolyte to the system in the flotation step. The potentials are preferably controlled by varying the pH. Specifically, such control is carried out by controlling the pH of the system in the flotation step to be between around neutrality and a weak acidity. The pH is adjusted by adding acids such as hydrochloric or sulfuric acid. In the case of adding an inorganic electrolyte, salts such as calcium chloride, magnesium chloride, potassium chloride, sodium chloride, calcium sulfate, magnesium sulfate, potassium sulfate, sodium sulfate, and aluminum sulfate are added in such a way as to provide the desired ξ potentials.

In the present invention, the ξ potentials of ink particles and pulp can be measured with a ξ potential measuring instrument. The numerical value of the ξ potential is somewhat varied depending on the method of measurement. In the present invention, the measurement is made by the electrophoretic method using System 3000 manufactured by Pen KeS Co. Since the pulp slurry has too high a concentration for the ξ potential measurement, a suitable amount of a slurry sample is added to a 0.005 M solution of potassium chloride. More specifically, the pulp slurry in the flotation step is diluted as such for use as a pulp sample in the ξ potential measurement with the above-mentioned measuring instrument, while the filtrate obtained by the filtration of the pulp slurry in the flotation step through a 120-mesh or 200-mesh sieve is diluted for use as an ink sample in the ξ potential measurement with the above-mentioned measuring instrument. The ξ potential of pulp is measurable by using the pulp slurry in the flotation step as such in the measurement. By contrast, in the case of the ξ potential measurement of ink, since the amount of ink is small as compared with that of pulp, filtration with a finer-mesh sieve is necessary when the amount of fine fibers is extremely large. On the other hand, when satisfactory separation is impossible by filtration, the ξ potential of ink can be calculated by subtracting the electric charge distribution of pulp from the electric charge distribution of ink-pulp. The System 3000 manufactured by Pen Kem Co. is capable of measuring electric charge distribution as well.

Although the reason why bulkier pulp sheets can be obtained by adjusting the interfacial potentials of ink particles and pulp in the flotation step as described above has not necessarily been elucidated, the following reason may be conceivable by way of example. The control of the ξ potentials to be in the aforementioned ranges leads to reduced electric charges on pulp to minimize the electrostatic repulsion. According to conventional deinking methods, floating fine fibers are removed either together with ink in the course of flotation or in the washing step. By contrast, it is believed that the electrostatic repulsion is minimized by the ξ potential control according to the present invention to enable fine fibers to be adsorbed on longer fibers and hence retained in the system without causing outflow thereof to thereby maintain a given interfiber distance, whereby the density of pulp is decreased to lower the density of the resulting pulp sheet.

According to another embodiment of the present invention, there is provided a deinking process at least comprising the step of stripping ink from wastepaper as the starting material and the step of removing the stripped ink by the flotation method, characterized by using at least one surfactant for ink stripping and effecting the flotation step after controlling the interfacial potential as the ξ potential of ink particles in a pulp slurry containing the stripped ink to be in the range of −5 mV to −60 mV and that of pulp to be in the range of −15 mV to +15 mV with a difference of at least 10 mV in interfacial potential as the ξ potential between the ink particles and the pulp.

As a result of further detailed investigations on the interfacial potentials and the deinking performance in the flotation step on the basis of the foregoing finding, the inventors of the present invention have found out that there is a correlation between the interfacial potentials of ink particles and pulp and the results of deinking (the bulk density of the pulp sheet in particular) in the flotation step. Specifically, in an arbitrary deinking process including the flotation step, when the desired results are obtained, the interfacial potentials of ink and pulp are measured to select suitable ranges of the interfacial potentials in the system, the final results of deinking can be estimated only by observing whether or not the interfacial potentials in the system fall within these suitable ranges. In other words, it can be judged that the results of deinking obtained by this deinking treatment can be excellent when, for example, the interfacial potentials (ξ potentials) of ink particles and pulp in the flotation step are −5 mV to −60 mV and −15 mV to +15 mV, respectively, with a difference of at least 10 mV in interfacial potential as the ξ potential between the ink particles and the pulp as described above. When the interfacial potentials of the ink particles and the pulp are outside these ranges to the contrary, it may be estimated that the results of deinking are poor. This method of the present invention for estimating the results of deinking from the interfacial potentials of ink particles and pulp in the flotation step is so highly reliable that it becomes an effective means for controlling the deinking treatment in the operation of real equipment.

Accordingly, the present invention provides a deinking process at least comprising the step of stripping ink from wastepaper as the starting material and the step of removing the stripped ink by the flotation method, characterized by continuing the deinking treatment when the interfacial potential as the ξ potential of ink particles is in the range of −5mV to −60 mV and that of pulp is in the range of −15 mV to +15 mV with a difference of at least 10 mV in interfacial potential as the ξ potential between the ink particles and the pulp as a result of measurement of the interfacial potentials of the ink particles and the pulp in the flotation step. The present invention also provides a deinking process comprising at least the step of stripping ink from wastepaper as the starting material and the step of removing the stripped ink by the flotation method, determining interfacial potentials of the ink particles and the pulp in the flotation step, then estimating the deinking performance by determining a potential of the ink particles, that of pulp, and the difference in ξ potential between the ink particles and the pulp.

Detailed Description of the Invention

In the deinking process of the present invention, at least one surfactant is used for ink stripping. As the surfactant, there can be used those known as conventional deinking agents, preferably cationic surfactants, anionic surfactants, and nonionic surfactants, among which nonionic surfactants are especially preferred. The use of at least one member selected from among the following nonionic surfactants (A) to (D) is preferred. The following nonionic surfactants (A), (B) and (C) are especially preferred, among which the following nonionic surfactant (C) is further preferred.

<Nonionic surfactant (A): A reaction product obtained by adding an alkylene oxide to a mixture of an oil & fat and an alcohol>

A nonionic surfactant (A) is an alkylene oxide adduct of a mixture of an oil & fat and a mono- or polyhydric alcohol. The alkylene oxide is added to the mixture described above in an amount, on the average, of 5 to 300 moles, preferably 20 to 150 moles, per mole of the mixture. Examples of the alkylene oxide include ethylene oxide, propylene oxide, and butylene oxide, which may be used alone or in the form of a mixture of two or more of them.

The mixing ratio of the oil & fat to the alcohol is preferably 1/0.1 to 1/6, particularly preferably 1/0.3 to 1/3. When this ratio falls with in the above-mentioned range, a reclaimed pulp having an excellent appearance can be obtained since the ink stripping is efficiently attained.

Examples of the oils & fats as a starting material of the nonionic surfactant (A) include vegetable oils such as coconut oil, palm oil, olive oil, soybean oil, rape seed oil, and linseed oil; animal oils such as lard, beef tallow, and bone oil; and fish oils; hardened oils and semihardened oils thereof; and recovered oils obtained in refining processes of these oils & fats. Especially preferred are coconut oil, palm oil, and beef tallow.

Examples of the monohydric alcohol as a starting material of the nonionic surfactant (A) include those having an alkyl or alkenyl moiety of 8 to 24 carbon atoms, and those having an alkylphenyl moiety wherein the alkyl moiety has 6 to 14 carbon atoms. Those having an alkyl moiety of 12 to 18 carbon atoms are preferred. Specific examples thereof include 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-heneicosanol, 1-docosanol, 1-tricosanol, 1-tetracosanol, 2-octanol, 2-nonanol, 2-decanol, 2-undecanol, 2-dodecanol, 2-tridecanol, 2-tetradecanol, 2-pentadecanol, 2-hexadecanol, 2-heptadecanol, 2-octadecanol, 2-nonadecanol, 2-eicosanol, 2-octen-1-ol, 2-dodecen-1-ol, 2-undecen-1-ol, 2-tetradecen-1-ol, 2-pentadecen-1-ol, 2-hexadecen-1-ol, 2-octadecen-1-ol, 8-nonen-1-ol, 10-undecen-1-ol, 11-dodecen-1-ol, 12-tridecen-1-ol, 15-hexadecen-1-ol, oleyl alcohol, elaidyl alcohol, linoleyl alcohol, linolenyl alcohol, eleostearyl alcohol, ricinoyl alcohol, cyclononanol, cyclodecanol, cycloundecanol, cyclododecanol, cyclotridecanol, cyclotetradecanol, cyclopentadecanol, cyclohexadecanol, cycloheptadecanol, cyclooctadecanol, cyclononadecanol, cycloeicosanol, octylphenol, and nonylphenol.

Examples of the polyhydric alcohols as a starting material of the nonionic surfactant (A) include ethylene glycol, propylene glycol, trimethylene glycol, butylene glycol, 1,6-hexane glycol, 2-ethylbutane-1,2,3-triol, glycerol, trimethylolpropane, trimethylolethane, 1,2,4-butanetriol, 1,2,6-hexanetriol, 1,1,1-trimethylolhexane, tetramethylolcyclohexanol, diglycerol, mannitane, pentaerythritol, erythritol, arabitol, sorbitol, D-glycero-D-galactoheptose, D-glycero-D-glucoheptose, D-glycero-D-mannoheptose, D-glycero-L-mannoheptose, D-altroheptulose, D-mannoheptulose, D-altro-3-heptulose, D-glycero-D-galaheptitol, D-erythro-D-galaoctitol, D-glycero-D-mannooctulose, D-erythro-L-glononulose, cellobiose, maltose, lactose, gentianose, cellotriose, and stachyose. Preferred are ethylene glycol, propylene glycol, glycerol, and trimethylolpropane.

<Nonionic surfactant (B): a compound represented by the formula: $RCOO(AO)_m R'$>

Wherein R represents an alkyl or alkenyl group having 7 to 23 carbon atoms; R' represents a hydrogen atom, an alkyl group having 1 to 22 carbon atoms, an alkenyl group having 2 to 22 carbon atoms, or an acyl group having 2 to 22 carbon atoms, preferably a hydrogen atom; AO represents an oxyalkylene group having 2 to 4 carbon atoms; and m is an integer of 1 or more.

When the carbon atom number of the alkyl or alkenyl group in the definition of R is 7 to 23, the nonionic surfactant (B) exhibits an excellent ink-collecting ability and an excellent ink-stripping ability to thereby provide reclaimed pulp having a high whiteness and excellent appearance.

When the carbon atom number of the alkyl, alkenyl or acyl group in the definition of R' is 22 or less, the nonionic surfactant (B) exhibits an excellent ability for stripping ink from cellulose to thereby provide reclaimed pulp having an excellent appearance, and exhibits an appropriate lathering power to thereby attain an excellent workability.

The nonionic surfactant (B) is prepared by adding an alkylene oxide to a fatty acid by a conventional method, optionally followed by esterification or acylation. The alkylene oxide is added to a fatty acid in an amount, on the average, of 5 to 300 moles, preferably 10 to 150 moles, per mole of the fatty acid. That is, the nonionic surfactant (B) is generally a reaction product mixture comprising compounds each represented by the above-mentioned formula: $RCOO(AO)_m R'$. Examples of the alkylene oxide include those mentioned in the above explanation relating to the nonionic surfactant (A). It is preferred to use ethylene oxide and propylene oxide in a molar ratio of ethylene oxide to propylene oxide of 1/5 to 5/1 in the production of nonionic surfactant (B).

Examples of the fatty acids to be used for producing the nonionic surfactant (B) include those having an alkyl or alkenyl moiety, corresponding to R, of 7 to 23 carbon atoms, and specific examples thereof include caprylic acid, pelargonic acid, capric acid, undecanoic acid, lauric acid, tridecanoic acid, myristic acid, pentadecanoic acid, palmitic acid, margaric acid, stearic acid, oleic acid, elaidic acid, linoleic acid, linolenic acid, stearolic acid, ricinoleic acid, ricinoelaidic acid, nonadecanoic acid, arachidic acid, heneicosanoic acid, behenic acid, brassidic acid, erucic acid, tricosanoic acid, tetracosanoic acid, coconut oil fatty acid, beef tallow fatty acid, palm oil fatty acid, tall oil fatty acid, rape oil fatty acid, and fish oil fatty acid. Among nonionic surfactants (B), those having an alkyl or alkenyl group, particularly an alkyl group, represented by R of 11 to 23 carbon atoms are preferred.

<Nonionic surfactant (C): a compound represented by the formula: $RO(AO)_n H$>

Wherein R represents an alkyl or alkenyl group having 8 to 24 carbon atoms; AO represents an oxyalkylene group having 2 to 4 carbon atoms; and n is an integer of 1 or more.

When the carbon atom number of the alkyl or alkenyl group in the definition of R is 8 to 24, the nonionic surfactant (C) exhibits an excellent ability for stripping ink from cellulose to thereby provide reclaimed pulp having a high whiteness and an excellent appearance.

The nonionic surfactant (C) is prepared by adding an alkylene oxide to a monohydric alcohol by a conventional methods. The alkylene oxide is added to a monohydric alcohol in an amount, on the average, of 5 to 300 moles, preferably 7 to 150 moles, per mole of the monohydric alcohol. That is, the nonionic surfactant (C) is generally a reaction product mixture comprising compounds each represented by the above-mentioned formula: $RO(AO)_nH$. Examples of the alkylene oxide include those mentioned in the above description relating to the nonionic surfactant (A). It is preferred to use ethylene oxide and propylene oxide in a molar ratio of ethylene oxide to propylene oxide of 1/5 to 5/1 in the production of the nonionic surfactant (C).

Examples of the monohydric alcohols to be used for producing the nonionic surfactant (C) include those having an alkyl or alkenyl moiety of 8 to 24 carbon atoms, and those having an alkylphenyl moiety wherein the alkyl moiety having 6 to 14 carbon atoms, and specific examples thereof include those mentioned in the foregoing description relating to the nonionic surfactant (A). Among nonionic surfactants (C), those having an alkyl or alkenyl group, particularly an alkyl group, represented by R of 14 to 24 carbon atoms are preferred. <Nonionic surfactant (D): A reaction product obtained by adding an alkylene oxide to a polyvalent carboxylic acid or an acid anhydride thereof, or a reaction product obtained by adding an alkylne oxide to a mixture of a polyvalent (or polybasic) carboxylic acid or an acid anhydride thereof, and an alcohol>

Examples of the polyvalent (or polybasic) carboxylic acid and acid anhydride thereof as a starting material of the nonionic surfactant (D) include oxalic acid, malonic acid, succinic acid, methylsuccinic acid, maleic acid, glutaric acid, adipic acid, phthalic acid, fumaric acid, itaconic acid, malic acid, tartaric acid, maleinized (or maleated) oleic acid, citric acid, percitric acid, trimellitic acid, butanetetracarboxylic acid, pyromellitic acid, tetradecanehexacarboxylic acid, maleic anhydride, succinic anhydride, oxalic anhydride, itaconic anhydride, glutaric anhydride, phthalic anhydride, trimellitic anhydride, pyromellitic anhydride, and stearylsuccinic anhydride.

Dimer acids and polymer acids of higher fatty acids having 14 to 22 carbon atoms are also included in the scope of the polybasic carboxylic acids. Dimer acids and polymer acids herein can be synthesized by a method wherein a monoolefinic carboxylic acid or a diolefinic carboxylic acid, such as an unsaturated fatty acid monomer, e.g., oleic acid, linoleic acid, and linolenic acid, is subjected to thermal polymerization such as a Diels-Alder reaction, or another method. The polymer acid herein is a polycarboxylic acid having 3 or more carboxyl groups in a molecule and does not includes a dimer acid. The dimer acid or polymer acid used herein may be a mixture thereof with an unreacted monomer acid. That is, it is not concerned that an unreacted monomer acid is present as far as the effects of the present invention are not failed.

Examples of the alcohol as a starting material of the nonionic surfactant (D) include monohydric and polyhydric alcohols, and specific examples thereof include those mentioned in the foregoing description relating to the nonionic surfactant (A).

In the production of the nonionic surfactant (D) with a polybasic carboxylic acid or an acid anhydride thereof (I) and an alcohol (II), the compounds (I) and (II) are preferably used in a molar ratio of (I) to (II) of 1/0.02 to 5, particularly 1/0.1 to 3. When the molar ratio falls within this range, the above-mentioned nonionic surfactant (D) can efficiently collect fine ink drops and the collected ink drops are effectively removed out in flotation.

On the other hand, higher fatty acids or salts thereof are suitably used as the anionic surfactant. Quaternary ammonium salts are used as the cationic surfactant, mono(long-chain alkyl) quaternary ammonium salts are particularly preferred.

The surfactant may be added in any step of the deinking process. However, it is usually added in the pulping step. The addition amount thereof is not particularly restricted. Any known deinking agent other than the foregoing nonionic surfactants (A) to (D) may of course be used in combination therewith.

In the deinking process of the present invention, a cationic compound, an amine, an acid salt of an amine, or an amphoteric compound is preferably made present in the system in flotation. Additional use of such a compound can further improve the bulkiness of pulp sheets.

Examples of the cationic compounds include mono (long-chain alkyl) quaternary ammonium salts, di (long-chain alkyl) quaternary ammonium salts, pyridinium salts having a substituent group on the nitrogen atom thereof, and cationic polymers. Among cationic compounds, particularly preferred are ones represented by the following formulae $(a_1)$ to $(c_1)$:

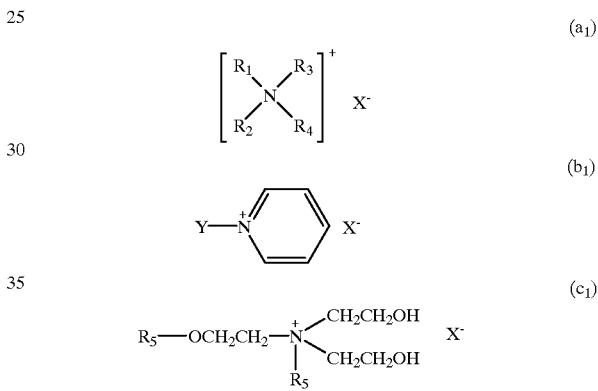

in the formulae $(a_1)$ to $(c_1)$, $R_1$ and $R_2$ may be the same or different from each other and each represents an alkyl, alkenyl or β-hydroxyalkyl group having 10 to 24 carbon atoms; $R_3$ and $R_4$ may be the same or different from one each other and each represents an alkyl or hydroxyalkyl group having 1 to 8 carbon atoms, a benzyl group, or a group represented by the formula: —$(AO)_n$—Z (wherein AO represented by an oxyalkylene group having 2 to 4 carbon atoms; Z represents a hydrogen atom or an acyl group; and n is an integer of from 1 to 50); $R_5$ represents an alkyl, alkenyl or β-hydroxyalkyl group having 8 to 36 carbon atoms; $X^-$ represents a counter ion; and Y represents an alkyl, alkenyl or μ-hydroxyalkyl group having 8 to 36 carbon atoms, a group represented by the formula: $R_5COOCH_2$— (wherein $R_5$ is as defined above), a group represented by the formula: $R_5CONHCH_2$— (wherein $R_5$ is as defined above) or a group represented by the formula: $R_5OCH_2$— (wherein $R_5$ is as defined above).

Examples of the amines and the acid salts of the amines include primary amines, secondary amines, tertiary amines, cyclic amines, imidazoles, imidazolines, inorganic acid salts of these amines, organic acid salts of these amines, and polymers containing amino groups. Amines or acid salts of amines represented by the following formulae $(a_2)$ to $(e_2)$ are preferred as the amine or the acid salt of the amie.

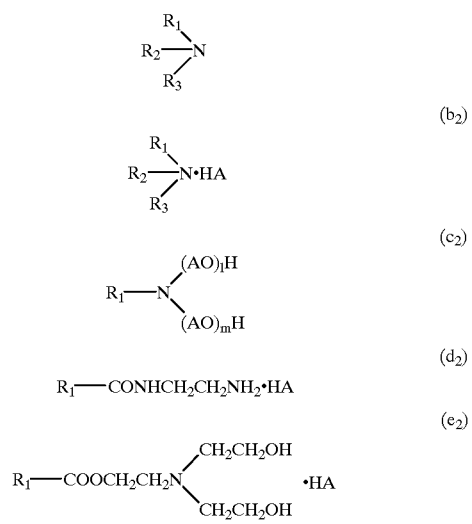

(a₂)

(b₂)

(c₂)

(d₂) R₁—CONHCH₂CH₂NH₂·HA (e₂) R₁—COOCH₂CH₂N(CH₂CH₂OH)(CH₂CH₂OH)·HA in the formulae (a₂) to (e₂), $R_1$ represents an alkyl, alkenyl or μ-hydroxyalkyl group having 8 to 36 carbon atoms; $R_2$ and $R_3$ may be the same or different from each other and each represents a hydrogen atom, an alkyl group having 1 to 24 carbon atoms or an alkenyl group having 2 to 24 carbon atoms; HA represents an inorganic or organic acid; AO represents an oxyalkylene group having 2 to 4 carbon atoms; and l and m are each zero or a positive integer with the proviso that l plus m is an integer of 1 to 300.

Examples of the amphoteric compounds include betaines, amine oxides, phospholipids, proteins, and amphoteric polymers. Amphoteric compounds represented by the following formulae (a₃) to (d₃) are particularly preferred as the amphoteric compound.

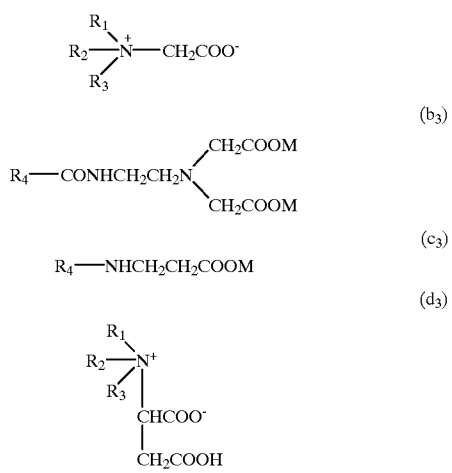

(a₃)

(b₃) R₄—CONHCH₂CH₂N(CH₂COOM)(CH₂COOM)

(c₃) R₄—NHCH₂CH₂COOM (d₃)

in the formulae (a₃) to (d₃), $R_1$, $R_2$ and $R_3$ may be the same or different from one another and each represents an alkyl group having 1 to 24 carbon atoms or an alkenyl group having 2 to 24 carbon atoms; $R_4$ represents an alkyl, alkenyl or β-hydroxyalkyl group having 8 to 36 carbon atoms; and M represents a hydrogen atom, an alkali metal atom, ½ mole of an alkaline earth metal atom or an ammonium group.

At least one member selected from the group consisting of cationic compounds, amines, acid salts of amines, and amphoteric compounds is used in an amount of 0.001 to 5.0% by weight, preferably 0.01 to 1.0% by weight, based on the weight of wastepaper (i.e., the absoluted dry weight of wastepaper) in flotation. When the above-mentioned at least one member selected is present in the system, i.e., in the slurry, in flotation in such an amount as described above, ink can be selectively removed from the system.

The deinking process of the present invention, which is characterized by the aforementioned control of the interfacial potentials of ink particles and pulp in the flotation step, and comprises at least the step of stripping ink from wastepaper and the step of removing the stripped ink from the flotation system. Other steps can be carried out in accordance with the conventional deinking methods. That is, the deinking process may comprise, as the main steps, a disintegration (or pulping) step, an aging step, (if necessary, a kneading step), a flotation step and a washing step. The deinking process may further comprise other step(s), if necessary. The respective steps may be carried out two or more times.

EXAMPLES

The following Examples will more specifically illustrate the present invention, though they should not be construed as limiting the scope of the present invention.

<Compound to be added>

Amines, acid salts of amines, cationic compounds and amphoteric compounds additionally used, if necessary, in the following Examples are listed in the following Tables 1 to 12.

TABLE 1

| Formula | Compd. No. | Structure in the Formula | | |
|---|---|---|---|---|
| | | $R_1$ | $R_2$ | $R_3$ |
| R₁R₂R₃N | I-a-1 | 12 | H | H |
| | I-a-2 | 12 | 1 | 1 |
| | I-a-3 | 18 | 18 | 1 |
| | I-a-4 | 22 | 1 | H |

TABLE 2

| Formula | Compd. No. | Structure in the Formula | | | |
|---|---|---|---|---|---|
| | | $R_1$ | $R_2$ | $R_3$ | HA |
| R₁R₂R₃N·HA | I-b-1 | 12 | H | H | CH₃COOH |

TABLE 3

| Formula | Compd. No. | Structure in the Formula | | |
|---|---|---|---|---|
| | | $R_1$ | $l + m$ | AO EO/PO |
| R₁N((AO)ₗH)((AO)ₗH) | 1-c-1 | 12 | 4 | 100/0 |

TABLE 4

| Formula | Compd. No. | Structure in the Formula | |
|---|---|---|---|
| | | $R_1$ | HA |
| $R_1CONHCH_2CH_2NH_2 \cdot HA$ | I-d-1 | 22 | ½ $H_2SO_4$ |

TABLE 5

| Formula | Compd. No. | Structure in the Formula | |
|---|---|---|---|
| | | $R_1$ | HA |
| $R_1COOCH_2CH_2N\begin{smallmatrix}CH_2CH_2OH\\ \cdot HA\\ CH_2CH_2OH\end{smallmatrix}$ | I-e-1 | 18 | HCl |

TABLE 6

| Formula | Compd. No. | Structure in the Formula | | |
|---|---|---|---|---|
| | | $R_1$ | $R_2$ | $R_3$ |
| $\begin{smallmatrix}R_1\\ R_2-\overset{\oplus}{N}CH_2COO^\ominus\\ R_3\end{smallmatrix}$ | II-a-1 | 12 | 1 | 1 |

TABLE 7

| Formula | Compd. No. | Structure in the Formula | |
|---|---|---|---|
| | | $R_4$ | M |
| $R_4CONHCH_2CH_2N\begin{smallmatrix}CH_2COOM\\ CH_2COOM\end{smallmatrix}$ | II-b-1 | 18 | Na |

TABLE 8

| Formula | Compd. No. | Structure in the Formula | |
|---|---|---|---|
| | | $R_4$ | M |
| $R_4NHCH_2CH_2COOM$ | II-c-1 | 18 | Na |

TABLE 9

| Formula | Compd. No. | Structure in the Formula | | |
|---|---|---|---|---|
| | | $R_1$ | $R_2$ | $R_3$ |
| $\begin{smallmatrix}R_1\\ R_2-\overset{\oplus}{N}\\ R_3\ \ \ CHCOO^\ominus\\ \ \ \ \ \ \ \ \ \ \ |\\ \ \ \ \ \ \ \ \ CH_2COOH\end{smallmatrix}$ | II-d-1 | 12 | 1 | 1 |

TABLE 10

| Formula | Compd. No. | Structure in the Formula | | | | |
|---|---|---|---|---|---|---|
| | | $R_1$ | $R_2$ | $R_3$ | $R_4$ | $X^-$ |
| $\left(\begin{smallmatrix}R_1\ \ \ R_3\\ \ \ N\\ R_2\ \ \ R_4\end{smallmatrix}\right)^+ X^-$ | III-a-1 | 12 | 18 | 1 | 1 | $CH_3COO^-$ |
| | III-a-2 | 18 | 18 | 2 | 2 | $Cl^-$ |

TABLE 11

| Formula | Compd. No. | Structure in the Formula | |
|---|---|---|---|
| | | Y | $X^-$ |
| $Y-\overset{\oplus}{N}\bigcirc\ \ X^\ominus$ | III-b-1 | $C_{18}H_{37}OCH_2-$ | $Br^-$ |

TABLE 12

| Formula | Compd. No. | Structure in the Formula | | |
|---|---|---|---|---|
| | | $R_{6a}$ | $R_{6b}$ | $X^-$ |
| $R_{6b}-O-CH_2CH_2\overset{\oplus}{\underset{R_{6a}}{N}}\begin{smallmatrix}CH_2CH_2OH\\ CH_2CH_2OH\end{smallmatrix}\ \ X^\ominus$ | III-c-1 | 18 | 18 Fl | $Cl^-$ |

Example 1

Wastepapers (newspapers/leaflets:70/30) as the starting material which were recovered in a city were cut into 4 cm×4 cm pieces. A given amount thereof was fed into a bench disintegrator. Then, warm water, 1% by weight (based on the starting material) of sodium hydroxide, 3% by weight (based on the starting material) of sodium silicate, 3% by weight (based on the starting material) of a 30% aqueous solution of hydrogen peroxide and 0.2% by weight (based on the starting material) of a block adduct of stearyl alcohol with 10 moles of EO and 10 moles of PO (in terms of the average number of moles of addition) as a deinking agent were added thereto, and the resultant mixture having a pulp concentration of 5% by weight was disintegrated at 40° C. for 10 minutes. The resulting pulp slurry was aged at 40° C. for 60 minutes, and then warm water was added for dilution to a pulp concentration of 1%. The pulp slurry was adjusted with respect to the pH by using sulfuric acid to control the interfacial potentials ($\xi$ potentials) of ink and pulp as shown in Table 13, at which stage the compound to be added as shown in Table 13, if to be added, was further added. The pulp slurry was subject to flotation at 40° C. for 10 minutes. The amount of the added compound of Table 13 was based on the absolute dry weight of wastepaper, while the $\xi$ potentials of Table 13 scarcely varied throughout the flotation step. The $\xi$ potential was measured with the System 3000 manufactured by Pen Kem Co. according to the aforementioned procedure. After the flotation treatment, pulp slurry was treated on a TAPPI standard sheet machine to give pulp sheet. The pulp sheet thus obtained were pressed under a pressure of 5 kgf/cm² and then air-dried to measure the bulkiness thereof. The results are shown in Table 13.

In this Example, the bulkiness was expressed in terms of bulk demsity. The bulk density was calculated from the thickess of a 25 cm×25 cm pulp sheet, measure with a micrometer, and the weigth thereof according to the following formula:

bulk density [g/cm³]=(weight of sheet)/(25×25×sheet thickness)

In is believed that the pulp sheet is bulkier and better in printability and the like as the bulk density thereof is lowered, while a difference of 0.02 in bulk density can well recognized as a significant difference.

TABLE 13

| Test | ζ potential (mV) | | | Compd. to be added | | Bulk |
|---|---|---|---|---|---|---|
| No. | pH | ink | pulp | Symbol | Concn. (%) | density |
| 1 | 10.0 | −35.8 | −16.4 | — | — | 0.56 |
| 2 | 9.0 | −34.8 | −16.1 | — | — | 0.56 |
| 3 | 7.5 | −29.4 | −5.5 | — | — | 0.54 |
| 4 | 7.0 | −28.5 | −3.3 | — | — | 0.53 |
| 5 | 6.0 | −26.0 | −3.0 | — | — | 0.53 |
| 6 | 5.0 | −12.0 | −1.8 | — | — | 0.54 |
| 7 | 4.0 | −4.0 | −0.2 | — | — | 0.57 |
| 8 | 10.0 | −35.8 | −16.4 | I-a-1 | 0.05 | 0.56 |
| 9 | 7.0 | −28.5 | −3.3 | I-a-1 | 0.05 | 0.51 |
| 10 | 7.0 | −28.5 | −3.3 | I-a-3 | 0.2 | 0.52 |
| 11 | 7.0 | −28.5 | −3.3 | II-c-1 | 0.2 | 0.52 |
| 12 | 7.0 | −28.5 | −3.3 | I-b-1 | 0.25 | 0.51 |
| 13 | 7.0 | −28.5 | −3.3 | III-a-2 | 0.25 | 0.51 |
| 14 | 7.5 | −29.4 | −5.5 | I-d-1 | 0.2 | 0.52 |
| 15 | 7.5 | −29.4 | −5.5 | II-d-1 | 0.2 | 0.52 |
| 16 | 7.5 | −29.4 | −5.5 | III-b-1 | 0.2 | 0.52 |
| 17 | 5.0 | −12.0 | −1.8 | I-a-2 | 0.2 | 0.53 |

Example 2

Wastepapers (newspapers/leaflets:70/30) as the starting material which were recovered in a city were cut into 4 cm ×4 cm pieces. A given amount thereof of was fed into a bench disintegrator. Then, warm water, 1% by weight (based on the starting material) of sodium hydroxide, 3% by weight (based on the starting material) of sodium silicate, 3% by weight (based on the starting material) of a 30% aqueous solution of hydrogen peroxide and 0.2% by weight (based on the starting material) of a random adduct of stearic acid with 15 moles of EO and 10 moles of PO (in terms of the average number of moles of addition) as a deinking agent were added thereto, and the resultant mixture having a pulp concentration of 4% by weight was disintegrated at 40° C. for 10 minutes. The resulting pulp slurry was aged at 40° C. for 60 minutes, and then warm water was added for dilution to a pulp concentration of 1%. The pulp slurry was adjusted with respect to the pH by using sulfuric acid to control the interfacial potentials (ξ potentials) of ink and pulp as shown in Table 14, at which stage the compound to be added as shown in Table 14, if to be added, was further added. The pulp slurry was subject to flotation at 40° C. for 10 minutes. The amount of the added compound of Table 14 was based on the absolute dry weight of wastepaper, while the ξ potentials of Table 14 scarcely varied throughout the flotation step. After the flotation treatment, pulp slurry was treated on a TAPPI standard sheet machine to give pulp sheet. The pulp sheet thus obtained were pressed under a pressure of 5 kgf/cm² and then air-dried to measure the bulkiness thereof. The results are shown in Table 14. In this Example, the ξ potential and the bulk density were measured respectively in the same manner as in Example 1.

TABLE 14

| Test | ζ potential (mV) | | | Compd. to be added | | Bulk |
|---|---|---|---|---|---|---|
| No. | pH | ink | pulp | Symbol | Concn. (%) | density |
| 18 | 10.0 | −30.4 | −15.4 | — | — | 0.56 |
| 19 | 9.0 | −30.0 | −15.2 | — | — | 0.55 |
| 20 | 7.5 | −27.2 | −5.0 | — | — | 0.53 |
| 21 | 7.0 | −27.0 | −3.0 | — | — | 0.53 |
| 22 | 6.0 | −24.5 | −3.0 | — | — | 0.53 |
| 23 | 5.0 | −10.8 | −0.8 | — | — | 0.53 |
| 24 | 7.0 | −27.0 | −3.0 | I-a-4 | 0.05 | 0.51 |
| 25 | 7.0 | −27.0 | −3.0 | I-b-1 | 0.2 | 0.50 |
| 26 | 7.0 | −27.0 | −3.0 | II-a-1 | 0.2 | 0.52 |
| 27 | 7.0 | −27.0 | −3.0 | I-c-1 | 0.25 | 0.52 |
| 28 | 7.0 | −27.0 | −3.0 | III-a-1 | 0.25 | 0.51 |
| 29 | 7.5 | −27.2 | −5.0 | I-e-1 | 0.2 | 0.53 |
| 30 | 7.5 | −27.2 | −5.0 | II-b-1 | 0.2 | 0.52 |
| 31 | 7.5 | −27.2 | −5.0 | III-c-1 | 0.2 | 0.53 |

Example 3

Wastepapers (newspapers/leaflets:70/30) as the starting material which were recovered in a city were cut into 4 cm×4 cm pieces. A given amount thereof was fed into a bench disintegrator. Then, warm water, 1% by weight (based on the starting material) of sodium hydroxide, 3% by weight (based on the starting material) of sodium silicate, 3% by weight (based on the starting material) of a 30% aqueous solution of hydrogen peroxide and 0.2% by weight (based on the starting material) of a random adduct of stearyl alcohol with 15 moles of EO and 15 moles of PO (in terms of the average number of moles of addition) as a deinking agent were added thereto, and the resultant mixture having a pulp concentration of 5% by weight was disintegrated at 40° C. for 10 minutes. The resulting pulp slurry was aged at 40° C. for 60 minutes, and then warm water was added for dilution to a pulp concentration of 1%. As shown in Table 15, the type and concentration (based on the starting material) of an inorganic salt were adjusted to control the interfacial potentials (ξ potentials) of ink and pulp. The pulp slurry was subject to flotation at 40° C. for 10 minutes. The ε potentials at the time of completion of flotation were substantially the same as those at the time of control thereof. After the flotation treatment, pulp slurry was treated on a TAPPI standard sheet machine to give pulp sheet. The pulp sheet thus obtained were pressed under a pressure of 5 kgf/cm² and then air-dried to measure the bulkiness thereof. The results are shown in Table 15. In this Example, the ξ potential and the bulk density were measured respectively in the same manner as in Example 1.

TABLE 15

| Test | ζ potential (mV) | | Inorg. Salt | | Bulk |
|---|---|---|---|---|---|
| No. | ink | pulp | Compd. | Concn. (%) | density |
| 32 | −35.4 | −16.2 | — | — | 0.57 |
| 33 | −34.8 | −13.4 | NaCl | 0.2 | 0.54 |

TABLE 15-continued

| Test No. | ζ potential (mV) ink | ζ potential (mV) pulp | Inorg. Salt Compd. | Concn. (%) | Bulk density |
|---|---|---|---|---|---|
| 34 | −27.2 | −6.2 | NaCl | 1.0 | 0.52 |
| 35 | −26.1 | −4.1 | NaCl | 5.0 | 0.52 |
| 36 | −27.0 | −4.0 | CaCl$_2$ | 2.0 | 0.53 |
| 37 | −24.5 | −3.0 | CaCl$_2$ | 3.0 | 0.52 |

Example 4

Wastepapers (newspapers/leaflets:70/30) as the starting material which were recovered in a city were cut into 4 cm×4 cm pieces. A given amount thereof was fed into a bench disintegrator. Then, warm water, 1% by weight (based on the starting material) of sodium hydroxide, 3% by weight (based on the starting material) of sodium silicate, 3% by weight (based on the starting material) of a 30% aqueous solution of hydrogen peroxide and 0.2% by weight (based on the starting material) of a block adduct of beef tallow/glycerol (1:1) with 70 moles of EO and 10 moles of PO (in terms of the average number of moles of addition) as a deinking agent were added thereto, and the resultant mixture having a pulp concentration of 5% by weight was disintegrated at 40° C. for 10 minutes. The resulting pulp slurry was aged at 40° C. for 60 minutes, and then warm water was added for dilution to a pulp centration of 1%. As shown in Table 16, the type and concentration (based on the starting material) of an inorganic salt were adjusted to control the interfacial potentials (ξ potentials) of ink and pulp. The pulp slurry was subject to flotation at 40° C. for 10 minutes. The ξ potentials at the time of completion of flotation were substantially the same as those at the time of control thereof. After the flotation treatment, pulp slurry was treated on a TAPPI standard sheet machine to give pulp sheet. The pulp sheet thus obtained were pressed under a pressure of 5 kgf/cm and then air-dried to measure the bulkiness thereof. The results are shown in Table 16. In this Example, the ξ potential and the bulk density were measured respectively in the same manner as in Example 1.

TABLE 16

| Test No. | ζ potential (mV) ink | ζ potential (mV) pulp | Inorg. Salt Compd. | Concn. (%) | Bulk density |
|---|---|---|---|---|---|
| 38 | −34.8 | −16.6 | — | — | 0.57 |
| 39 | −32.8 | −11.4 | Na$_2$SO$_4$ | 0.2 | 0.55 |
| 40 | −26.7 | −5.0 | Na$_2$SO$_4$ | 1.0 | 0.52 |
| 41 | −25.1 | −3.6 | Na$_2$SO$_4$ | 3.0 | 0.51 |
| 42 | −25.0 | −3.8 | NaNO$_3$ | 2.0 | 0.53 |
| 43 | −24.5 | −3.0 | KCl | 2.0 | 0.52 |

Example 5

Wastepapers (newspapers/leaflets:70/30) as the starting material which were recovered in a city were cut into 4 cm×4 cm pieces. A given amount thereof was fed into a bench disintegrator. Then, warm water, 1% by weight (based on the starting material) of sodium hydroxide, 3% by weight (based on the starting material) of sodium silicate, 3% by weight (based on the starting material) of a 30% aqueous solution of hydrogen peroxide and 0.2% by weight (based on the starting material) of a block adduct of stearyl alcohol with 10 moles of EO and 10 moles of PO (in terms of the average number of moles of addition) as a deinking agent were added thereto, and the resultant mixture having a pulp concentration of 5% by weight was disintegrated at 40° C. for 10 minutes. The resulting pulp slurry was aged at 40° C. for 60 minutes, and then warm water was added for dilution to a pulp concentration of 1%. As shown in Table 17, the type and concentration (based on the starting material) of an inorganic salt were adjusted to control the interfacial potentials (ξ potentials) of ink and pulp, at which stage the compound to be added as shown in Table 17, if to be added, was further added. The pulp slurry was subject to flotation at 40° C. for 10 minutes. The amount of the added compound of Table 17 was based on the absolute dry weight of wastepaper, while the ξ potentials of Table 17 scarcely varied throughout the flotation step. After the flotation treatment, pulp slurry was treated on a TAPPI standard sheet machine to give pulp sheet. The pulp sheet thus obtained were pressed under a pressure of 5 kgf/cm$^2$ and then air-dried to measure the bulkness thereof. The results are shown in Table 17. In this Example, the ξ potential and the bulk density were measured respectively in the same manner as in Example 1.

TABLE 17

| Test No. | ζ potential (mV) ink | ζ potential (mV) pulp | Inorg. salt Compd. | Concn. (%) | Compd. to be added Symbol | Concn. (%) | Bulk density |
|---|---|---|---|---|---|---|---|
| 44 | −34.8 | −16.6 | — | — | — | — | 0.57 |
| 45 | −28.8 | −5.8 | MgCl$_2$ | 3.0 | — | — | 0.55 |
| 46 | −28.8 | −5.8 | MgCl$_2$ | 3.0 | I-b-1 | 0.3 | 0.52 |
| 47 | −27.1 | −5.6 | Na$_2$SO$_4$ | 3.0 | — | — | 0.51 |
| 48 | −25.0 | −5.6 | Na$_2$SO$_4$ | 3.0 | II-a-1 | 0.3 | 0.53 |

Example 6

Wastepapers (newspapers/leaflets:70/30) as the starting material which were recovered in a city were cut into 4 cm×4 cm pieces. A given amount thereof was fed into a bench disintegrator. Then, warm water, 1% by weight (based on the starting material) of sodium hydroxide, 3% by weight (based on the starting material) of sodium silicate, 3% by weight (based on the starting material) of a 30% aqueous solution of hydrogen peroxide and 0.5% by weight (based on the starting material) of stearic acid as a deinking agent were added thereto, and the resultant mixture having a pulp concentration of 5% by weight was disintegrated at 40° C. for 10 minutes. The resulting pulp slurry was aged at 40° C. for 60 minutes, and then warm water was added for dilution to a pulp concentration of 1%. The pulp slurry was adjusted with respect to the pH by using sulfuric acid to control the interfacial potentials (ξ potentials) of ink and pulp as shown in Table 18, at which stage the compound to be added as shown in Table 18, if to be added, was further added. The pulp slurry was subject to flotation at 40° C. for 10 minutes. The amount of the added compound of Table 18 was based on the absolute dry weight of wastepaper, while the ξ potentials of Table 18 scarcely varied throughout the flotation step. After the flotation treatment, pulp slurry was treated on a TAPPI standard sheet machine to give pulp sheet. The pulp sheet thus obtained were pressed under a pressure of 5 kgf/cm$^2$ and then air-dried to measure the bulkiness thereof. The results are shown in Table 18. In this Example, the ξ potential and the bulk density were measured respectively in the same manner as in Example 1.

TABLE 18

| Test No. | ξ potential (mV) | | Compd. to be added | | Bulk density |
|---|---|---|---|---|---|
| | pH | ink | pulp | Symbol | Concn. (%) | |
| 49 | 10.0 | −38.2 | −17.4 | — | — | 0.57 |
| 50 | 7.0 | −31.4 | −9.2 | — | — | 0.55 |
| 51 | 7.0 | −28.5 | −3.3 | I-a-1 | 0.5 | 0.54 |

Example 7

Wastepapers (newspapers/leaflets:70/30) as the starting material which were recovered in a city were cut into 4 cm×4 cm pieces. A given amount thereof was fed into a bench disintegrator. Then, warm water, 1% by weight (based on the starting material) of sodium hydroxide, 3% by weight (based on the starting material) of sodium silicate, 3% by weight (based on the starting material) of a 30% aqueous solution of hydrogen peroxide and 0.5% by weight (based on the starting material) of cetyltrimethylammonium chloride as a deinking agent were added thereto, and the resultant mixture having a pulp concentration of 5% by weight was disintegrated at 40° C. for 10 minutes. The resulting pulp slurry was aged at 40° C. for 60 minutes, and then warm water was added for dilution to a pulp concentration of 1%. The pulp slurry was adjusted with respect to the pH by using sulfuric acid to control the interfacial potentials (ξ potentials) of ink and pulp as shown in Table 19, at which stage the compound to be added as shown in Table 19, if to be added, was further added. The pulp slurry was subject to flotation at 40° C. for 10 minutes. The amount of the added compound of Table 19 was based on the absolute dry weight of wastepaper, while the ξ potentials of Table 19 scarcely varied throughout the flotation step. After the flotation treatment, pulp slurry was treated on a TAPPI standard sheet machine to give pulp sheet. The pulp sheet thus obtained were pressed under a pressure of 5 kgf/cm$^2$ and then air-dried to measure the bulkiness thereof. The results are shown in Table 19. In this Example, the ξ potential and the bulk density were measured respectively in the same manner as in Example 1.

TABLE 19

| Test No. | ξ potential (mV) | | | Compd. to be added | | Bulk density |
|---|---|---|---|---|---|---|
| | pH | ink | pulp | Symbol | Concn. (%) | |
| 52 | 10.0 | −20.9 | −12.8 | — | — | 0.56 |
| 53 | 7.0 | −19.4 | −0.8 | — | — | 0.53 |
| 54 | 7.0 | −15.6 | −0.4 | I-a-1 | 0.20 | 0.53 |

Example 8

Wastepapers (newspapers/leaflets: 70/30) as the starting material which were recovered in a city were cut into 4 cm×4 cm pieces. A given amount thereof was fed into a bench disintegrator. Then, warm water, 1% by weight (based on the starting material) of sodium hydroxide, 3% by weight (based on the starting material) of sodium silicate, 3% by weight (based on the starting material) of a 30% aqueous solution of hydrogen peroxide and 0.2% by weight (based on the starting material) of a block adduct of stearyl alcohol with 10 moles of EO and 10 moles of PO as a deinking agent were added thereto, and the resultant mixture having a pulp concentration of 15% by weight was disintegrated at 40° C. for 10 minutes. The resulting pulp slurry was aged at 50° C. for 60 minutes, and then warm water was added for dilution to a pulp concentration of 1%. The pulp slurry was adjusted with respect to the pH by using sulfuric acid to control the interfacial potentials (ξ potentials) of ink and pulp as shown in Table 20, at which stage the compound to be added as shown in Table 20, if to be added, was further added. The pulp slurry was subject to flotation at 40° C. for 10 minutes. The amount of the added compound of Table 20 was based on the absolute dry weight of wastepaper, while the ξ potentials of Table 20 scarcely varied throughout the flotation step. After the flotation treatment, pulp slurry was treated on a TAPPI standard sheet machine to give pulp sheet. The pulp sheet thus obtained were pressed under a pressure of 5 kgf/cm$^2$ and then air-dried to measure the bulkiness thereof. The results are shown in Table 20. In this Example, the ξ potential and the bulk density were measured respectively in the same manner as in Example 1.

TABLE 20

| Test No. | ξ potential (mV) | | | Compd. to be added | | Bulk density |
|---|---|---|---|---|---|---|
| | pH | ink | pulp | Symbol | Concn. (%) | |
| 55 | 10.0 | −61.2 | −35.2 | — | — | 0.58 |
| 56 | 9.0 | −60.4 | −17.5 | — | — | 0.58 |
| 57 | 7.5 | −59.9 | −14.9 | — | — | 0.56 |
| 58 | 7.0 | −56.2 | −14.6 | — | — | 0.55 |
| 59 | 6.0 | −48.2 | −14.5 | — | — | 0.55 |
| 60 | 7.5 | −59.9 | −14.9 | I-a-1 | 0.20 | 0.54 |
| 61 | 7.0 | −56.2 | −14.6 | I-a-1 | 0.20 | 0.54 |
| 62 | 6.0 | −48.2 | −14.5 | I-a-1 | 0.05 | 0.54 |

What is claimed is:

1. A deinking process comprising the steps of:
   stripping ink from a pulp slurry formed from wastepaper as the starting material, wherein at least one surfactant is used, and
   removing the stripped ink by flotation, comprising the step of:
   controlling before or in the flotation step the interfacial potential (ξ potential) of ink particles in said pulp slurry containing stripped ink to be in the range of −5 mV to −60 mV and that of pulp in said pulp slurry containing stripped ink to be in the range of −15 mV to +15 mV, wherein a difference of at least 10 mV exists between the interfacial potential (ξ potential) of said ink particles and said pulp.

2. The deinking process as claimed in claim 1, comprising controlling before or in the floatation step the interfacial potential (ξ potential) of said ink particle to be in the range of −10 mV to −40 mV and that of said pulp to be in the range of −5 mV to +5 mV.

3. The deinking process as claimed in claim 1 or 2, wherein the ξ potentials of said ink and said pulp are controlled by pH adjustment before or in the flotation step.

4. The deinking process as claimed in claim 1 or 2, wherein the ξ potentials of said ink and said pulp are controlled by adding an inorganic electrolyte before or in the flotation step.

5. The deinking process as claimed in claims 1 or 2, wherein at least a part of the flotation step is effected in the presence of at least one member selected from the group consisting of amine compounds, ammonium salts, cationic compounds, and amphoteric compounds.

6. A deinking process comprising the steps of:
   stripping ink from wastepaper as the starting material, and
   removing the stripped ink by a flotation method, comprising,:
      continuing the deinking treatment when the interfacial potential ($\xi$ potential) of ink particles is in the range of −5 mV to −60 mV and that of pulp is in the range of −15 mV to +15 mV, wherein a difference of at least 10 mV in interfacial potential ($\xi$ potential) exists between said ink particles and said pulp as a result of measurement of the interfacial potentials of said ink particles and said pulp in the flotation step.

7. A method for controlling the deinking performance in a deinking process comprising steps of:
   stripping ink from a pulp slurry formed from wastepaper as the starting material, and
   removing the stripped ink by flotation, comprising the steps of:
      measuring before or in the flotation step the interfacial potential ($\xi$ potential) of ink particles and pulp in said pulp slurry containing stripped ink, and
      adjusting the interfacial potential ($\xi$ potential) of the ink particles to the range of −5 mV to −60 mV and the interfacial potential ($\xi$ potential) of pulp to −15 mV to +15mV, wherein a difference of at least 10 mV in interfacial potential ($\xi$ potential) exists between said ink particles and said pulp.

* * * * *